United States Patent [19]

Berti

[11] Patent Number: 4,575,293

[45] Date of Patent: Mar. 11, 1986

[54] MACHINE TOOL HOLDER HAVING OPPOSED RAMP MEMBERS

[76] Inventor: Mario Berti, 76 Station St., Bayswater, Victoria 3153, Australia

[21] Appl. No.: 630,223

[22] Filed: Jul. 12, 1984

[51] Int. Cl.⁴ .................. B23B 31/20; B23B 31/04
[52] U.S. Cl. .................. 409/234; 82/36 A; 279/47
[58] Field of Search ............ 279/1 A, 47, 48, 50, 279/51, 52, 86, 83; 409/232, 234; 408/239 R, 239 A, 240, 185, 197; 82/36 A, 36 B

[56] References Cited

U.S. PATENT DOCUMENTS

| 387,475 | 8/1888 | Whaling | 279/83 X |
| 1,114,653 | 10/1914 | Starin | 279/52 |
| 1,680,631 | 8/1928 | Palaith | 279/51 X |
| 3,542,385 | 11/1970 | Seitter | 279/51 |
| 3,550,489 | 12/1970 | Kuhn et al. | 82/36 A |

FOREIGN PATENT DOCUMENTS 683981 12/1952 United Kingdom ............ 279/51

*Primary Examiner*—Fred Silverberg
*Attorney, Agent, or Firm*—Andrus, Sceales, Starke & Sawall

[57] ABSTRACT

A machine tool holder comprising a body is operably mountable on a material working machine. The body is provided with a bore adapted to receive the shank of a tool, which shank has at least two ramp surfaces. Clamping members comprising at least two ramp surfaces are adapted to cooperate with the ramp surfaces of the shank to draw the shank into the bore and secure the shank relative to the bore.

5 Claims, 8 Drawing Figures

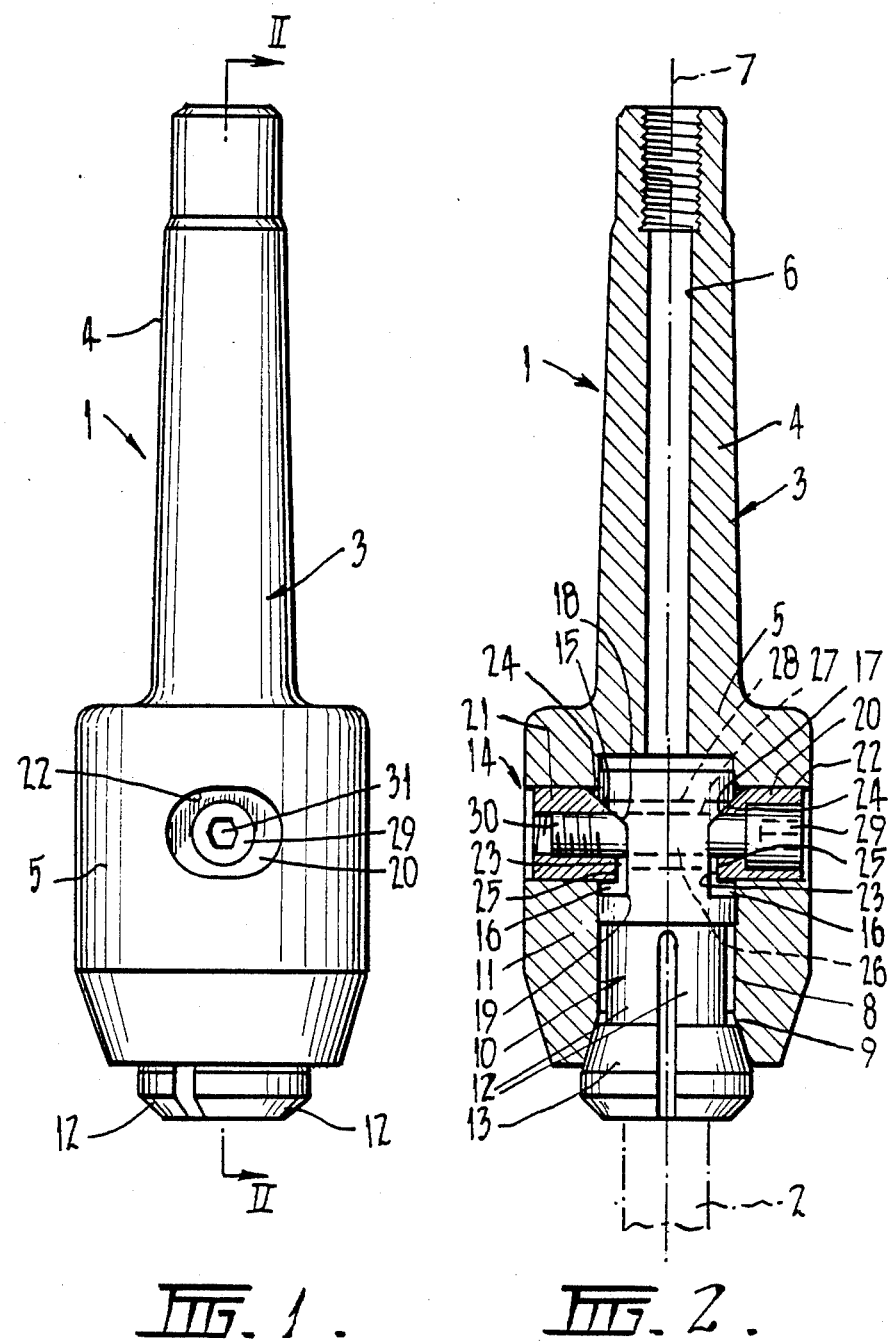

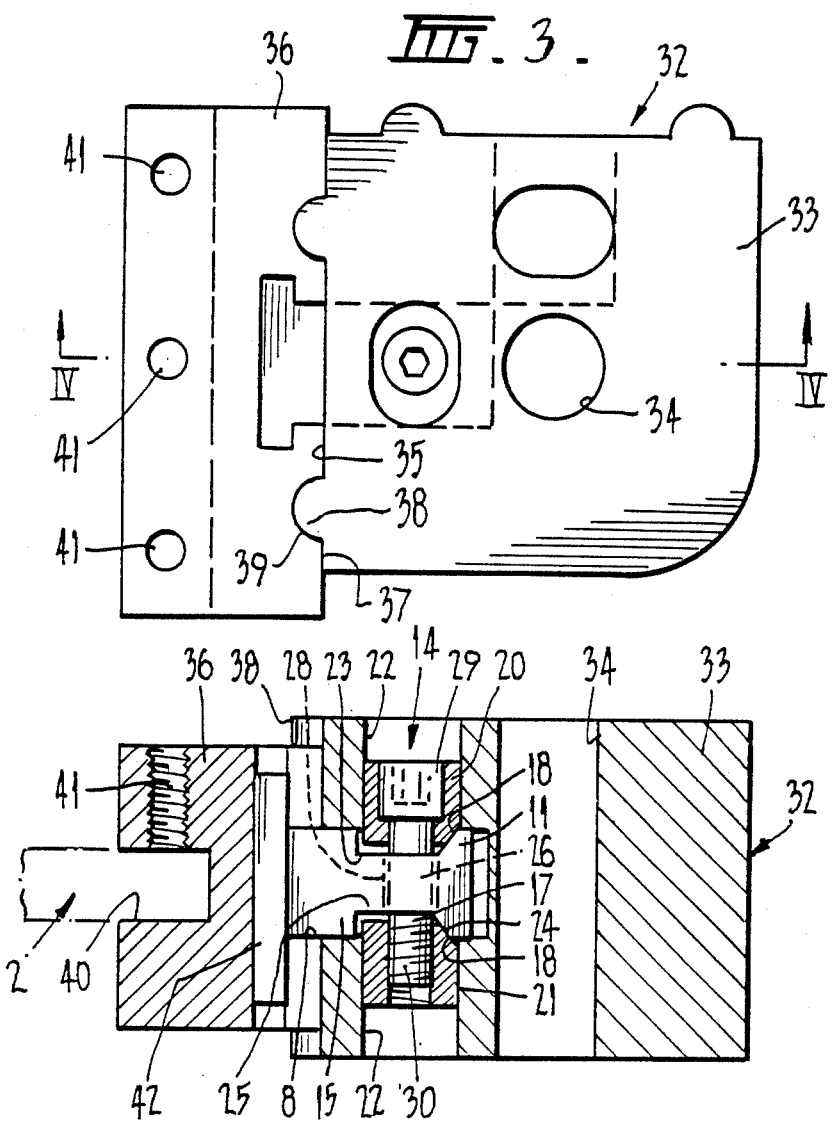

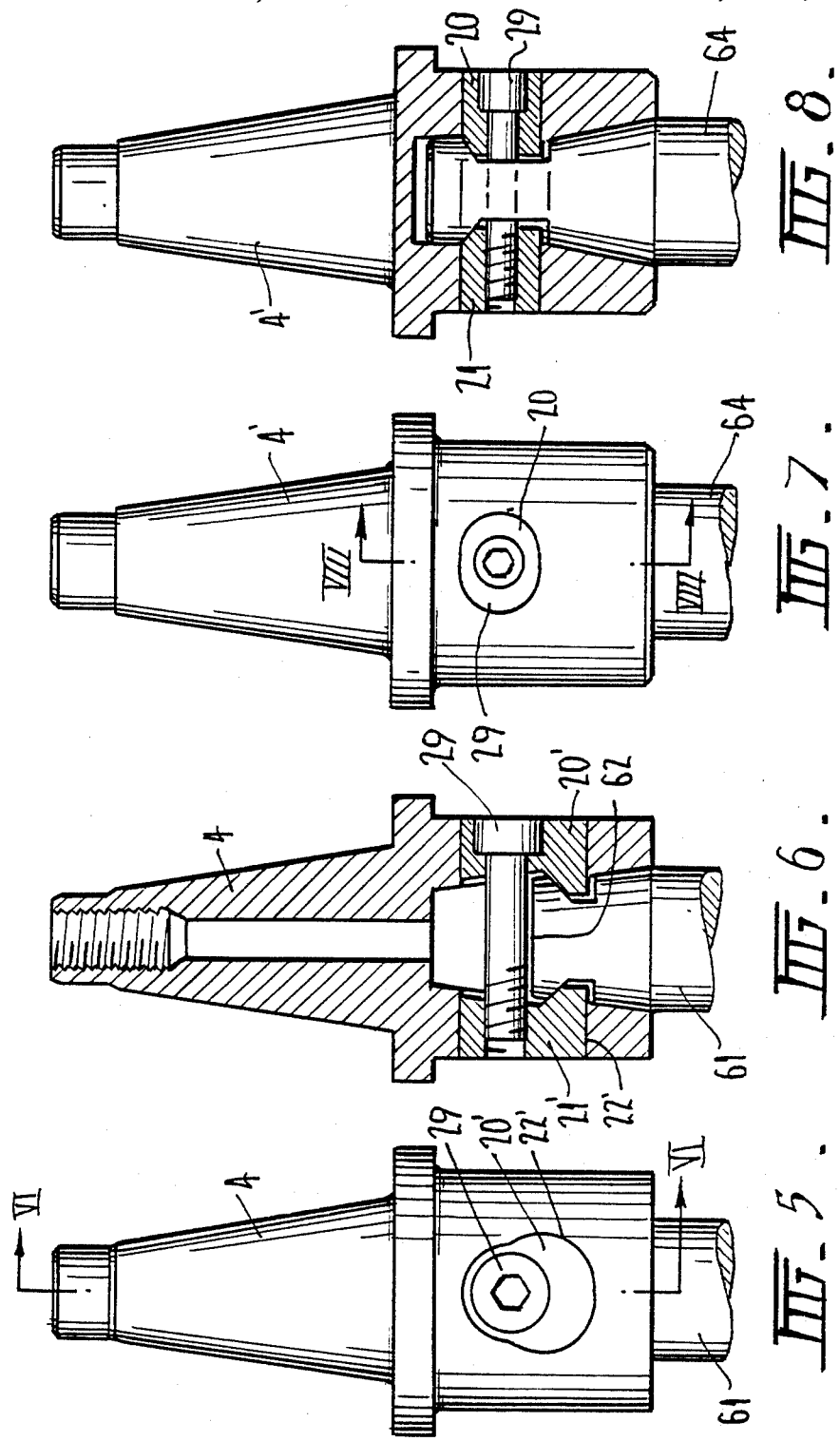

MACHINE TOOL HOLDER HAVING OPPOSED RAMP MEMBERS

This invention relates generally to a machine tool holder for setting a cutting tool in a material working machine. An example of the machines in relation to which the tool holder is applicable is a lathe for working metal or wood, whilst examples of the machine tool holders are a split collet chuck and tool turret used in a lathe to hold cutting bits. It will be convenient to hereinafter describe the present invention in relation to that example machine and tool holders although it should be appreciated that the present invention is not limited to the exemplary machine and tool holders.

A variety of tool holders have been developed to firmly support and secure cutting tools within metal and wood working machines such as lathes. One such type of machine tool holder includes: mounting means adapted to mount the tool holder on a material working machine; a tool or a tool engaging means adapted to support a material cutting tool, the tool or the tool engaging means being mountable on the mounting means for movement relative thereto so as to allow movement of the tool to set the tool relative to material to be worked by the machine during tool holder use; and, a clamping assembly selectively operable to clamp the tool or tool engaging means to the mounting means and thereby positively set the supported tool relative to the material to be worked.

Whilst this type of machine tool holder is generally satisfactory in setting the cutting tool relative to the machine and material to be worked, some clamping assemblies are particularly intricate in construction and operation. As such, capital cost of the machine tool holder can be excessive. In addition, a considerable portion of the machine operator's time can be spent in setting the tool in the machine, particularly when that tool requires regular adjustment or replacement. Other clamping asemblies require special tools and instruments for opertion which, in turn, can add to the ultimate cost of the tool holders. That can also lead to difficulties should that special tool or instrument be misplaced or damaged.

It is an object of the present invention to provide a relatively simple machine tool holder which will at least in part alleviate some of the abovementioned disadvantages.

The present invention provides a machine tool holder comprising
a body,
mounting means adapted to mount the tool holder on a material working machine,
a bore in the body adapted to receive a shank on a tool or a tool engaging means, which shank having at least two ramp surfaces,
and clamping means comprising at least two ramp surfaces adapted to be moved to co-operate with the ramp surfaces of the shank to draw the shank into the bore and clampingly locate the shank in the bore.

Preferably, the shank and the body have abutments adapted to be drawn into abutting relation as the shank is drawn into the bore by the clamping means.

Preferably, the bore and the shank have matingly tapered surfaces acting as said abutments and which serve to centre the shank in the bore as the shank is drawn into the bore.

Preferably, the ramp surfaces of the body are joined by a bolt which can be tightened to move the ramp surfaces of the body into engagement with the ramp surfaces of the shank.

Preferably, the shank has an aperture therein through which the bolt may pass. However, in an alternative the bolt passes across an inner end of the shank. This alternative allows for quicker assembly and freeing but is more dangerous as the shank may fall out.

In a particular construction the present invention provides a machine tool holder comprising
a body,
mounting means adapted to mount the tool holder on a material working machine,
a bore in the body adapted to receive a shank on a tool or a tool engaging means, which shank having at least two ramp surfaces and clamping means comprising
a cam follower element provided on one of the mounting means and shank;
a pair of opposed cam elements provided on the other one of the mounting means and shank so that the cam follower element is interposed therebetween, the cam elements being movable toward and away from each other and the cam follower element; and,
a cam actuator member selectively operable to move the cam elements toward and away from each other, relative movement of the cam elements toward each other moving those cam elements into coacting engagement with the cam follower element to cause the cam follower element to responsively move and thereby move the shank and the mounting means into clamped interengagement.

Preferably, the cam follower element and the cam elements are so arranged relative to each other and to the mounting means and tool engaging means, that relative movement between the mounting means and the tool engaging means during clamping and unclamping is in a direction perpendicular to the relative movement between the cam elements. In that regard, preferably, the cam follower element and the cam elements are so profiled that, during interengagement, the cam follower element tends to be forceably moved from between the cam elements along a path of movement extending in a direction at least substantially perpendicular to the cam element path of movement.

Preferably, the cam follower element and cam elements are additionally so arranged that the cam elements move the cam follower element only when the cam elements engage the follower element and are moved toward each other. Thus, preferably, the cam elements only move the mounting means and tool engaging means into clamped interengagement, movement of the cam elements away from each other simply disengaging those elements from the cam follower element allowing manual movement of the mounting means and tool engaging means out of clamped interengagement.

Preferably, the cam follower element is so mountable on one of the mounting means and tool engaging means as to be lineally movable. Preferably, the cam elements are mountable on the other one of the mounting means and tool engaging means as to also be lineally movable.

Preferably, the cam follower element has a pair of cam surfaces and each of the cam elements has a cam surface adapted to be associated with a respective one of the cam follower element cam surfaces. Preferably, it is associated cam surfaces of respective cam elements and the cam follower element which progressively interengage during clamping assembly operation. Preferably, those associated cam surfaces are so arranged in facing opposition to each other that they can react with each other to positively retain the cam follower between the cam elements and thus the interengagement between the mounting means and tool engaging means.

Preferably, each cam surface of the follower element and the cam surface of the associated cam elements have complementary profiles. Preferably, each cam surface has a profile which includes a ramp region. Preferably, those cam surfaces are so positioned that, as the cam elements are moved toward each other during clamping, their ramp regions co-operatively progressively engage with the ramp region of a respective one of the cam follower elements to cause a sliding movement to occur between those engaging regions. As a result, the follower element is forceably moved relative to the cam elements.

Preferably, each cam surface also has a profile which includes a stop region adapted to limit movement of the cam elements toward each other and thus responsive movement of the cam follower element. In that regard, preferably, the cam surfaces are so positioned that the stop regions of the cam elements are initially spaced from the stop region of a respective one of the cam follower elements during movement of the cam elements toward each other and progressive engagement of the ramp regions, but continued movement of the cam elements toward each other and responsive movement of the cam follower element eventually causes the stop regions thereof to interengage to limit further movement of the cam elements.

The cam follower element may be a cam follower provided on the tool engaging means and may be slidably mounted in a mounting bore in the tool mounting means. The cam surfaces of that follower may be spaced apart and opposed to each other.

The cam elements may be cam slugs movably mounted in the mounting means. That mounting may be by way of a guide bore in which the cam slugs are slidably mounted. That guide bore may extend perpendicular to the intended path of movement of the tool engaging means. Moreover, that bore may extend across the mounting bore and thus the intended path of movement of the cam follower.

The cam slugs and guide bore may be of corresponding cross-sectional shape. That shape may be non-circular so that the cam slugs are confined to linear movement along the guide bore.

Preferably, the cam actuator member is adapted to extend coaxially of the guide bore between the cam slugs with ends thereof connected to a respective cam slug. The actuator member preferably is operable so that the cam slugs are moved therealong when moving relatively toward and away from each other. Preferably, the connection between the cam slugs and actuator member is such as to form a reaction therebetween when the actuator member is operated to move the cam slugs therealong.

The cam actuator member may include a screw-threaded actuator stud having a shank portion, an enlarged head portion defining one end, and a screw-threaded foot portion defining the other end of the actuator member. The actuator stud may be mounted in a stud bore extending through the cam slugs and cam follower. That stud bore may open through the stop regions of the cam surfaces of the cam slugs and cam follower.

The stud head portion may be adapted to abuttingly engage with one of the cam slugs whilst the foot portion may be adapted to screw-threadably engage with the other cam slug, the head portion being engageable to rotate same thereby rotating the stud and moving the other cam slug toward or away from the one cam slug depending upon the direction of rotation. The stud head portion may be recessed into the one cam slug, the recess defining an abutment shoulder against which the head portion engages.

The following description refers in more detail to the above and further features of the machine tool holder of the present invention. To facilitate an understanding of the invention, reference is made to the accompanying drawings where the machine tool holder is illustrated in two preferred embodiments. It should be understood that the features of the invention are not limited to the specific embodiments as illustrated in the drawings.

In the drawings:

FIG. 1 is a side elevational view of a machine tool holder according to one preferred embodiment of the present invention;

FIG. 2 is a cross-sectional view of the tool holder of FIG. 1 as seen through section II—II;

FIG. 3 is a plan view of a machine tool holder according to another preferred embodiment of the present invention;

FIG. 4 is a cross-sectional view of the tool holder of FIG. 3 as seen through section IV—IV;

FIG. 5 is a side elevational view of another machine tool holder; and

FIG. 6 is a cross-sectional view as seen through section VI—VI.

FIG. 7 is a side elevational view of another machine tool holder; and

FIG. 8 is a cross-sectional view as seen through section VIII—VIII.

Referring initially to FIGS. 1 and 2, there is generally illustrated a machine tool holder 1, for holding cutting tool 2, and which machine tool holder can be mounted in a material working machine (not shown). The machine tool holder 1, includes mounting means in the form of elongated chuck mounting body 3, having spindle portion 4, tapered in a usual manner for accommodation in a machine arbor (not shown) as will be well understood by those skilled in this art. Mounting body 3, also has cylindrical housing portion 5, formed integral with spindle portion 4. Spindle portion 4, has access bore 6, extending along longitudinal axis 7, of mounting body 3, and opening into mounting bore 8, which is formed in housing portion 5, and in turn opens therefrom. Mounting bore 8, has a generally cylindrical surface except for divergent surface region 9, opening from housing portion 5.

The machine tool holder 1, also includes tool engaging means in the form of split collet 10, located substantially within mounting bore 8, but protruding from the opening thereof. Split collet 10, has body portion 11, slidably positioned within mounting bore, and a plurality of radially deflectable claw portions 12, formed integral with body portion 11, and extending therefrom in spaced apart relation about longitudinal axis 7. Claw portions 12, are shaped and positioned radially outwardly from each other so as to slidably receive cutting tool 2, therebetween, as will be well understood by those skilled in this art. In addition, claw portions 12, are generally slightly spaced inwardly from mounting bore 8, except for divergent surface region 13, formed on each claw portion and arranged to interferingly engage divergent surface region 9, of mounting bore 8.

As so far described, machine tool holder 1, functions in a manner well understood by those skilled in this art. In that regard, with split collet 10, positioned so that divergent surface regions 9, and 13, are disengaged or only slightly engaged, cutting tool 2, can be positioned between claw portions 12. Thereafter, split collet 10, is caused to move axially into mounting bore 8, so that divergent surface regions 9, and 13, interferingly interengage causing claw portions 12, to resiliently deflect radially inwardly and the jammed against cutting tool 2, to retain cutting tool 2, therebetween. Reverse movement of split collet 10, relieves that engagement between divergent surface regions 9, and 13, causing claw portions 12, to release cutting tool 2.

Machine tool holder 1, also includes clamping assembly 14, selectively operable to move split collet 10, within housing bore 8, to thereby clamp and unclamp split collet 10, and mounting body 3. Clamping assembly 14, includes cam follower 15, formed integral with and forming a co-extension of split collet body portion 11. Cam follower 15, has a pair of open-ended opposed slots 16, formed therein with each defining cam surfaces 17, having flat ramp region 18, and flat stop region 19. Ramp regions 18, extend generally perpendicular to each other and generally at about 45° to longitudinal axis 7, whilst stop regions 19, extend generally parallel to each other and to longitudinal axis 7.

Clamping assembly 14, also includes a pair of cam slugs 20, and 21, slidably mounted in guide bore 22, formed in housing portion 5, generally perpendicular to longitudinal axis 7. As clearly illustrated in FIG. 1, cam slugs 20, and 21 and guide bore 22, are conveniently of a non-circular cross-sectional shape and may be elliptical as illustrated. This shaping confines cam slugs 20, and 21, to linear movement along guide bore 22.

Cam slugs 20, and 21, are spaced apart with cam follower 15, interposed therebetween. Each cam slug 20, and 21, has cam surface 23, facing a respective cam surface 17, of cam follower 15. Moreover, each cam surface 23, is of a complementary profile to that of cam surfaces 17, and includes flat ramp region 24, and flat stop region 25, to enable interengagement between cam surfaces 17, and 23.

Clamping assembly 14, further includes cam actuator 26, selectively operable to actually move cam slugs 20, and 21, toward and away from each other and thus, respectively, into and out of progressive engagement with cam follower 15. Cam actuator 26, has shank portion 27, extending through stud bore 28, formed in cam follower 15, and opening through cam surfaces 17. Cam actuator 26, further has enlarged head portion 29, recessed into and abuttingly engaging cam slug 20, and foot portion 30, screw-threadably connected to cam slug 21. Head portion 29, is provided with actuating wrench socket 31.

In operating clamping assembly 14, to clamp split collet 10, and mounting body 3, actuator study 26, is manually rotated through a suitable actuating wrench inserted in socket 31, to draw cam slugs 20, and 21, together causing progressively increasing interengagement between associated ramp regions 18, and 24. That interengagement pushes cam follower 15, out from between cam slugs 20, and 21, and deeper into mounting bore 8. that, inturn, moves split collet 10, into mounting bore 8, as previously detailed. Rotation of actuator stud 26, continues until cutting tool 2, is firmly clamped within split collet 10, or until associated stop regions 19, and 25, abut to limit further movement of cam slugs 20, and 21.

As will be appreciated, reverse rotation of actuator stud 26, will move cam slugs 20, and 21, away from each other progressively disengaging ramp regions 18, and 24, and allowing manual withdrawal of split collet 10, from mounting bore 8. That withdrawal may be achieved by simply gripping claw portions 12, protruding from mounting bore 8, or by tapping out with a suitable rod passed along access bore 6. Rotation of the split collet 10 may facilitate withdrawal.

Turning now to FIGS. 3 and 4, where like reference numerals refer to like tool holder components, there is generally illustrated a machine tool holder in the form of tool turret for holding cutting tool 2, and by which that cutting tool 2, can be mounted in a material working machine (not shown).

The machine tool holder includes mounting means in the form of turret mounting block 33, having central bore 34, through which turret 32, is rotatably mounted on a material working machine. Mounting block 33, has mounting face 35, formed thereon and tool turret 32, also includes tool engaging means in the form of tool cradle 36, having mounting face 37, formed thereon and slidably positioned against mounting face 35. Tool cradle 36, is confined to linear sliding movement relative to mounting block 33, by virtue of co-operating guide ribs 38, provided on mounting face 35, and guide grooves 39, provided on mounting face 37.

Tool cradle 36, has slot 40, formed therein for receipt of cutting tool 2. Cutting tool 2, is therein retained by means of mounting studs (not shown) which can be screw-threadably mounted in bores 41, formed in cradle 36. As will be appreciated, movement of tool cradle 36, relative to mounting block 33, will adjust the position of cutting tool 2, relative to mounting block 33, and thus material to be worked.

The machine tool holder also includes clamping assembly 14, principally as previously described in relation to split collet chuck 1, illustrated in FIGS. 1 and 2. In tool turret 32, however, tool cradle 36, is located entirely outside mounting bore 8, and cam follower 15, is formed separately from tool cradle 36, and connected thereto through T-shaped tenon-and-mortise joint 42. In operating clamp assembly 14, to clamp together tool cradle 36, and mounting body 33, actuator stud 26, is manually rotated to draw together cam slugs 20, and 21, causing progressively increasing interengagement between associated ramp regions 18, and 24. That interengagement pushes cam follower 15, deeper into mounting bore 8, which in turn moves mounting faces 35, and 37, into frictional engagement so as to clamp tool cradle 36, against mounting block 33. Again, rotation of actuator stud 26, continues until mounting faces 35, and 37, are in interfering engagement or until stop regions 19, and 25, abut. Reverse rotation of actuator stud 26, will move cam slugs 20, and 21, away from each other progressively disengaging ramp regions 18, and 24, and relieving interengagement between mounting surfaces 35, and 38, to allow manual sliding movement of tool cradle 36.

The machine tool holder shown in FIGS. 5 and 6 is similar to that shown in FIGS. 1 and 2 and like reference numerals represent like parts.

The following differences are, however, to be noted.

The cutting tool 2 and split collet 10 are replaced by a shank 61. The shank 61 may be part of a tool engaging means, for instance a split collet or an arbor or may be a integral part of a tool itself.

The form of the guide bore 22' is somewhat different but nevertheless serves the same purpose in restricting rotation. The cam slugs 20' and 21' is also somewhat different.

Most significant, however, is that the shank 61 terminates at 62 and does not have stub bore 28 through which the shank portion 27 of the cam actuator 26 passes. This last has the advantage of quicker assembly and dissassembly of the shank 61 to the body 3 in that it is unnecessary to insert and remove the cam actuator 26 but has the disadvantage of reduced safety as compared to the construction shown in FIGS. 1 and 2.

The machine tool holder shown in FIGS. 7 and 8 is similar to that shown in FIGS. 1 and 2 and like reference numerals represent like parts.

The following differences are, however, to be noted.

The cutting tool 2 and split collet 10 are replaced by a shank 64. The shank 64 may be part of a tool engaging means, for instance, a split collet or an arbor or maybe an integral part of a tool itself.

The spindle portion 4' is somewhat differently shaped to suit a particular class of machine.

A machine tool holder according to the present invention is relatively simple in both construction and operation. In that regard, no special manufacturing techniques are required for the manufacture of that tool holder, little if any skill is required in setting and operation of that tool holder, and that operation does not require the use of any special tools or instruments.

Because the machine tool holder is relatively simple in construction, capital cost and cost of maintenance may be minimised.

It will be appreciated that various modifications and/or alterations may be made to the tool holder without departing from the ambit of the present invention as defined in the claims appended hereto.

I claim:

1. A machine tool holder comprising:
   a body,
   mounting means adapted to mount the tool holder on a material working machine,
   a conic bore in the body having a longitudinally extending axis, a shank on a tool mounting means received in said conic bore, said shank having a conic surface that matingly fits within the conic bore and two ramp surfaces which are disposed on opposite sides of the shank with respect to said axis,
   and clamping means comprising two bodies each having a ramp surface, said bodies being located in bores which are radial to said axis of said conic bore,
   said bodies and bores being of complementary non-circular cross-section so that said bodies are non-rotatable but slidably secured in said bores,
   a screw member acting simultaneously and equally on said bodies to urge them radially inward,
   and wherein the ramp surfaces of said shank are complementarily shaped and oriented with respect to said ramp surfaces of said bodies whereby to engage over a substantial area as the bodies are urged radially inward by said screw member to draw the shank into said conic bore and clampingly locate and centre the shank in said conic bore.

2. A machine tool holder as claimed in claim 1, wherein one of said bodies has a screw threaded bore in which one end of said screw member is screw threadingly engaged and the other of said bodies has an abutment against which a head located on the other end of said screw member abuts.

3. A machine tool holder as claimed in claim 1, wherein said shank has an aperture therein through which said screw member passes.

4. A machine tool holder as claimed in claim 1, wherein said tool mounting means has means for engaging a tool.

5. A machine tool holder as claimed in claim 1, wherein said tool mounting means carries a tool.

* * * * *